Oct. 19, 1954  M. E. DEVERALL  2,692,040
PORTABLE, MATERIAL-ELEVATING CONVEYER
Filed July 6, 1953  2 Sheets-Sheet 1
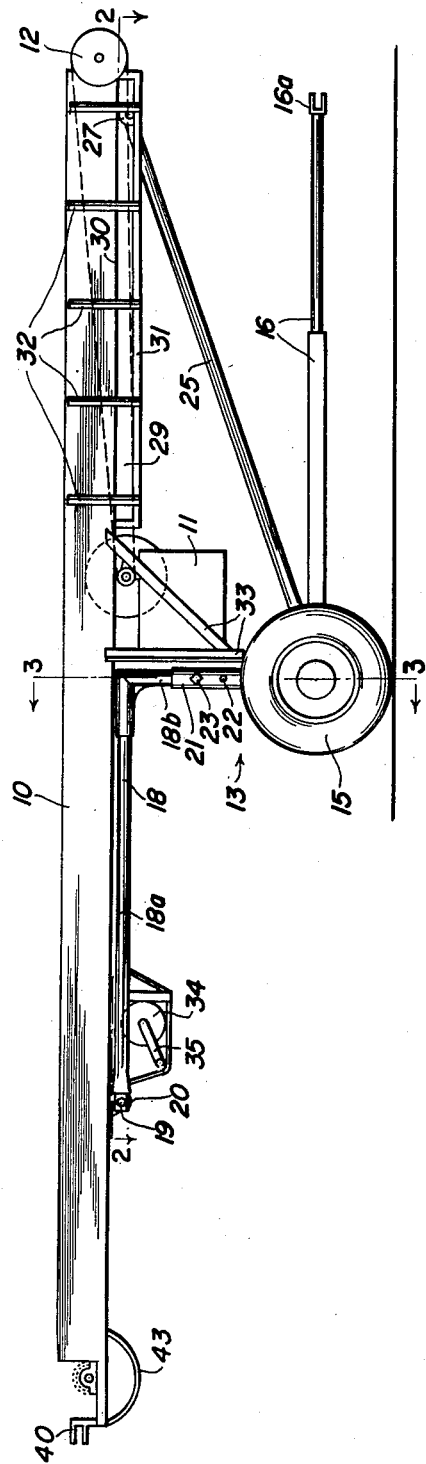
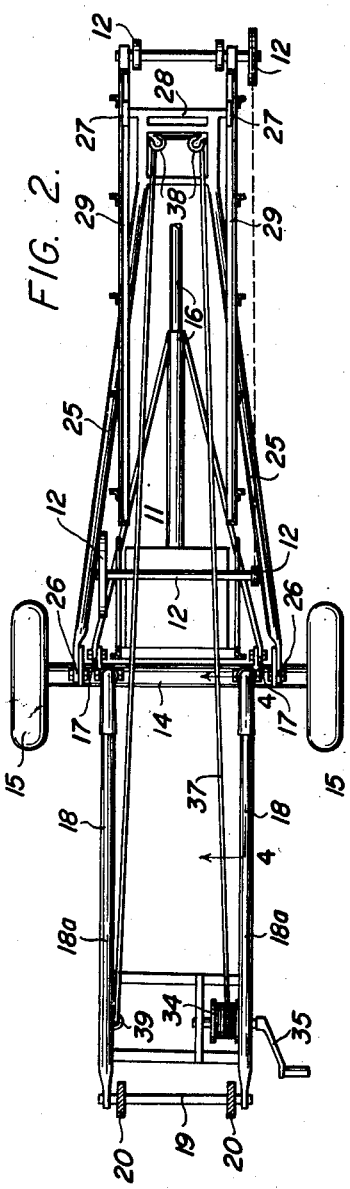
Inventor:
MELVIN E. DEVERALL,
By *H. Mallinckrodt and Philip A. Mallinckrodt.*
Attorneys Oct. 19, 1954   M. E. DEVERALL   2,692,040
PORTABLE, MATERIAL-ELEVATING CONVEYER
Filed July 6, 1953   2 Sheets-Sheet 2
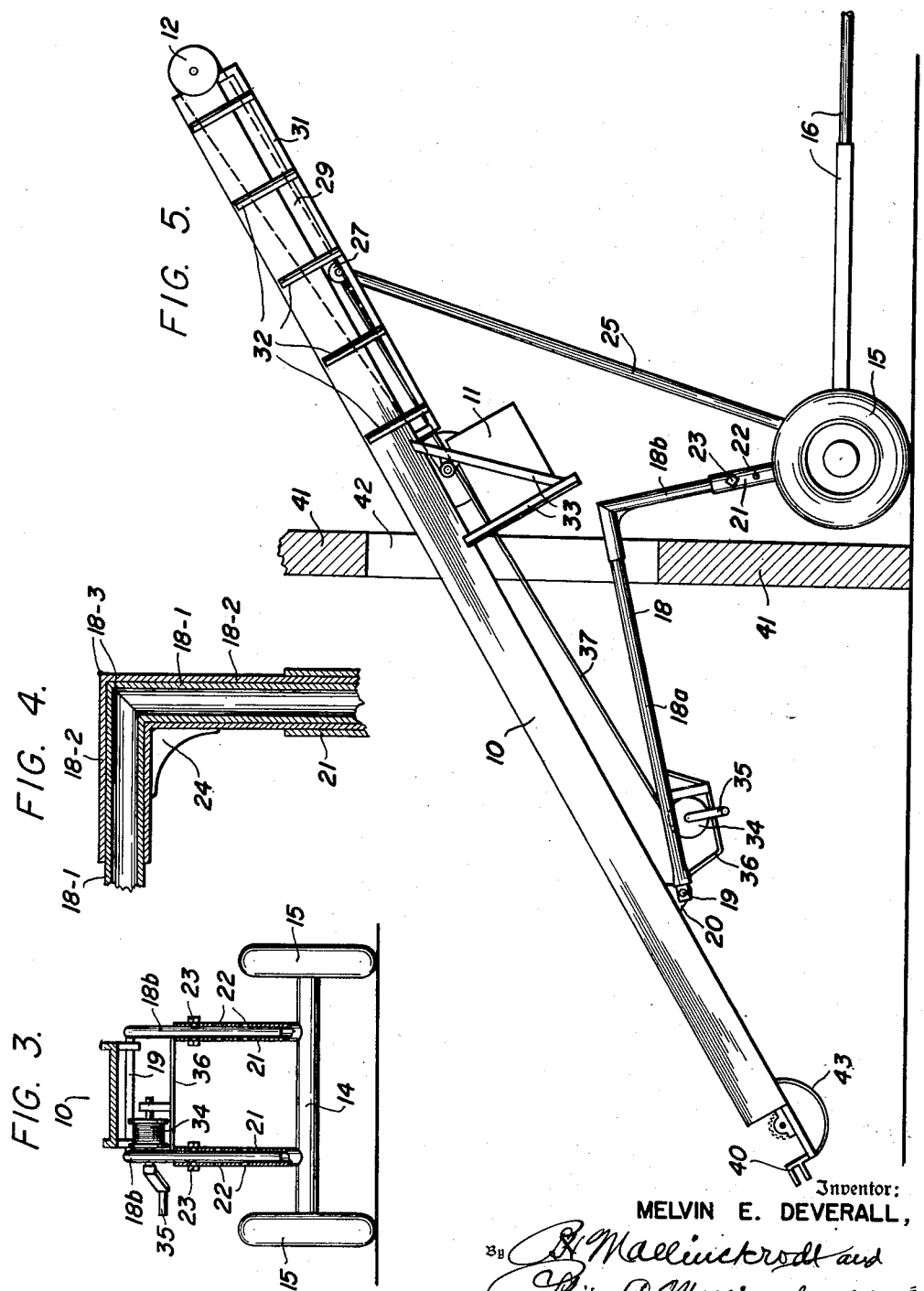
Inventor:
MELVIN E. DEVERALL,
By
Attorneys.

Patented Oct. 19, 1954

2,692,040

UNITED STATES PATENT OFFICE 2,692,040

PORTABLE, MATERIAL-ELEVATING CONVEYER

Melvin E. Deverall, Salt Lake City, Utah

Application July 6, 1953, Serial No. 366,347

11 Claims. (Cl. 198—121)

This invention relates to so-called elevating or loading conveyers which are portable in character, that is to say, which are mounted on a wheeled carriage for movement from place to place.

Equipment of this type is commonly used by farmers and others engaged in agricultural and related pursuits, such as chicken and stock raising, though it is useful in industry generally.

As customarily constructed, such portable conveyers ordinarily include an elongate conveyer structure of belt, scraper, or other common type, mounted on a wheeled frame provided with mechanism for actuating the conveyer and for adjusting its working position to such various degrees of slope relative to the horizontal as may be required by any given instance of use, for example, in the loading of agricultural produce into a truck from field level.

Practically all equipment of this character presently on the market is constructed with the conveyer-carrying frame mounted on a single two-wheel carriage disposed intermediate the length of the conveyer and braced by oppositely directed pairs of diagonal struts or braces extending from the axle structure of the carriage to respectively opposite end portions of the conveyer structure. This provides a highly maneuverable implement, possessing the rugged strength required for support and manipulation of the relatively heavy and elongate conveyor structure with respect to the restricted and localized undercarriage.

I have found, however, that this conventional construction greatly limits the usefulness of the implement, by reason of the nature of the undercarriage frame bracing. For example, because of the diagonal struts or braces, it is impossible to effectively introduce the conveyer structure through a window into a building, such as a hen house during the cleaning of same, while the equipment proper remains outside and the opposite end of the conveyer is in raised, discharge position relative to a truck.

The cantilever nature of the oppositely projecting end portions of the conveyer structure relative to the intermediate supporting carriage poses a considerable problem of adequate support, when stripping of encumbrances from the undercarriage of the implement is considered.

In accordance with my invention, one of the pairs of usual diagonal struts or braces eliminated, and a practically free and open underspace between the wheels of the carriage and the bed of the conveyer structure, along one end portion of the implement, is attained. This enables the implement to be backed up against the wall of a hen house or other building, with its one end portion extending through a window thereof and lowered to practically floor level, so that waste and other materials may be conveniently conveyed through the window to an elevated discharge above a truck, for loading purposes.

My structure not only affords new utility for the implement, but enables a new feature of height adjustability to be effectively and economically provided. Furthermore, it utilizes the weight of the engine most advantageously.

The purposes of the invention are attained by the provision of a substantially right-angular or L-shaped mounting frame between the wheel assembly and that end portion of the conveyer structure from which the customary diagonal struts or braces have been eliminated, and by making the short leg or bar portion of the L telescopic, so that the entire conveyer structure can be adjustably raised or lowered relative to the wheel assembly. Special attention is given the strength requirements of such frame, and the engine is underslung relative to the conveyer structure immediately adjacent the aforesaid short leg or bar member of the frame, but under that cantilever end portion of the conveyer structure which extends opposite to the extension of the frame.

These features together with others explained in connection with the detailed description of the preferred specific construction illustrated in the accompanying drawings, constitute the subject matter believed to be new and patentable.

In the drawings:

Fig. 1 represents a side elevation of the machine in position for transportation, trailer-fashion, behind a truck or other vehicle;

Fig. 2, a horizontal section taken on the line 2—2 of Fig. 1;

Fig. 3, a transverse vertical section taken on the line 3—3 of Fig. 1;

Fig. 4, an enlarged fragmentary section taken on the line 4—4 of Fig. 2; and

Fig. 5, a side elevation illustrating the conveyor structure in elevated position extending through the window of a building, the entire structure being adjusted to a position which is raised relative to that of the preceding figures.

Referring to the drawings:

The conveyer structure 10 may be of any desired endless type. The details of its construction are not important so far as this invention is concerned, though a continuous scraper conveyer provides a very desirable implement. As illustrated, it is motivated by an engine 11 transmitting rotary motion through a customary drive 12, which may advantageously be a chain and sprocket drive, having a proper drive ratio for the particular uses desired.

Such conveyer structure 10 is, of course, of elongate character, and, constructed of structural steel as it usually is, possesses considerable weight. It is mounted on a single two-wheel undercarriage, indicated generally 13, for the sake of maneuverability in connection with the material-loading and the material-unloading uses to which it is to be put.

The undercarriage 13 comprises a road wheel assembly, made up in this instance of a dead axle 14 on which a pair of road wheels 15 are journaled in transversely spaced relationship as respects the conveyer structure. Such road wheel assembly serves merely to mount the conveyer structure 10 as a trailer unit for transportation behind a truck or other vehicle. For this latter purpose, it is provided with a forwardly-projecting tongue assembly 16, which is preferably telescopic, as illustrated, in order to adapt the implement, as illustrated, in order to adapt the implement to a variety of tractor vehicles. The tongue assembly is desirably pivotally attached to the axle 14, as at 17, Fig. 2, and a conventional hitch 16a is advantageously provided.

The conveyer structure 10 is mounted on the road wheel asesembly by means of a right-angular or L-shaped frame structure, which advantageously includes a pair of individual right-angular or L-shaped frames 18 fabricated from steel pipe and disposed in identical fashion at opposite lateral sides of the conveyer structure. The long legs or stem members 18a of such frames extend longitudinally with such structure, rearwardly of the wheel assembly, and are pivotally attached thereto at their respective rearward ends, as by means of the transverse shaft 19, Fig. 2, journaled in ear members 20 which depend from the conveyer structure.

The transverse shaft 19 provides a pivot axis for the raising and lowering of the forward part of the conveyer structure, as will be explained hereinafter.

The right-angular or L-shaped frames 18 provide ideally for making the undercarriage of the implement height-adjustable, thereby rendering the implement more versatile and adaptable to the many different jobs it will be called upon to perform in use.

Thus, in the form illustrated, the short legs or bar members 18b of such frames 18 are telescopically received by respective upstanding post members 21, which rise from rigid securement, as by welding, to the axle 14 of the road wheel assembly, and a series of registering holes 22, Fig. 3, are provided through both the posts 21 and the short leg or bar members 18b for receiving respective bolts 23 in the securing of the right-angular or L-shaped frame structure for any given adjusted position.

In order to provide the strength required for the component frames 18, I have found it highly advantageous to fabricate them by assembling steel pipe in close fitting concentric relationship, as illustrated in Fig. 4, where 18-1 indicates the inner pipe and 18-2, the outer. The right-angular joint 18-3 of each is welded, and a relatively small reinforcing plate 24 is welded across the inside angle, as illustrated. The resulting framework possesses the rigidity and strength necessary to support, in cantilever fashion, the conveyer structure in all positions, for example, the elevated position of Fig. 5.

The oppositely extending or forward end portion of the conveyer structure 10 is supported in all positions by means of a diagonal strut or brace frame 25, whose width extends transversely with the width of the conveyer structure, and whose lower end is pivotally connected to the axle 14 of the road wheel assembly, as by means of pivotal connections 26, and whose opposite or upper end is connected with the forward end portion of the conveyer structure, for back and forth movement therealong, to accommodate the elevation and lowering of the conveyer to various positions of use.

In the illustrated instance, the connection of the forward end of the frame 25 to the conveyer structure 10 is of a rolling character, and is provided by a pair of rollers 27 journaled at the opposite ends of a crossbar 28, which is secured across the forward end of the frame 25. Such rollers are fitted into respective trackways 29, which depend from and extend along the forward end portion of the conveyer structure.

The trackways 29 are here provided by upper track members 30, secured to the underside of the conveyer structure 10, and against which the rollers 27 directly bear, and by elongate guide members 31, which are advantageously angles supported in spaced relationship to the tracks 30 by means of a series of structural members 32 fastened to the exterior lateral sides of the conveyer structure.

For best weight distribution relative to the afore-described right-angular or L-shaped, conveyer-mounting framework of the undercarriage of the implement, the engine 11 utilized for driving the conveyer is underslung intermediate the length of the conveyer structure, advantageously by means of a mounting bracket 33 which depends from the underside of the conveyer structure 10 so as to assume a position immediately in advance of the axle 14 and of the short leg or bar member portion of the conveyer-mounting framework when the conveyer structure is in the horizontal running position of Fig. 1.

For the purpose of elevating and lowering the conveyer for loading purposes, a conventional winch 34, shown as arranged for manual operation by means of a crank 35, is underslung relative to and at the rearward end of the conveyer-mounting framework 18, as by means of a dependent bracket frame 36. A cable 37 extends from wound supply on the drum of winch 34 to the forward end of the strut or brace frame 25, where it loops around a pair of pulleys 38, and returns long the opposite side of the implement to a secure anchorage on the conveyer-mounting framework 18, as at 39.

For any given use, the conveyer structure 10 is bodily raised or lowered to suitably adjusted position relative to the road wheels 15 by means of the afore-described adjustable relationship between conveyer-mounting framework 18 and the receiving posts 21. This may be conveniently accomplished by utilizing a jack of any suitable character to bodily lift the conveyer structure.

As so adjusted and in the horizontal position of Fig. 1, the implement may be conveniently pulled from place to place along highways and other roads by attachment of a suitable tractor vehicle to a main hitch 40, it being understood that the tongue 16 is raised and temporarily attached to the underside of the conveyer 10 by any suitable means, such as a hook (not shown), during such time.

The implement is conveniently maneuvered into positions of use which conventional implements of this type are not capable of assuming. This is well illustrated by the position of use shown in Fig. 5, where the implement is backed up (preferably manually) against the wall of a building 41, with the rearward end portion of the conveyer structure easily extending through a window 42 thereof and being lowered to approximately floor level, whereby materials within the building may be conveniently loaded into a waiting truck or other receptacle, or may be piled on the ground outside the building.

The conveyer structure 10 is placed into any desired loading or unloading slope relative to the horizontal by merely turning the winch handle 35 in the proper direction, it being noted that the drum of the winch is advantageously located for this purpose relative to the right-angular or L-shaped frame portion of the implement.

The tongue 16 is used principally for moving the implement about in a field by means of a truck or other vehicle which is to be loaded. Under such circumstances, the opposite end of the conveyer rests on the ground by means of a skid 43, which slides along the ground as the implement is being moved.

Whereas this invention is here illustrated and described with respect to a particular preferred embodiment thereof, it is to be understood that various changes may be made therein without departing from the scope of the claims which here follow.

I claim:

1. A portable conveyer implement as described, comprising, in combination with an elongate endless conveyer and a pair of road wheels mutually spaced on an axle extending transversely of said conveyer and disposed intermediate the length thereof, a pair of L-shaped structural frames having their short bar members rigidly attached to and rising from said axle at respectively opposite sides of said conveyer and their long stem members extending longitudinally with said conveyer outwardly from the road wheel and axle assembly to correspondingly disposed terminations adjacent one end of said conveyer; means pivotally attaching the terminal ends of said stem members to said conveyer; diagonal bracing means extending upwardly and outwardly, from pivotal attachment to said axle, to a termination adjacent the other end of said conveyer; elongate guideway means rigid with and extending along said other end portion of the conveyer, longitudinally of the latter; and guide means attached to the outer end of said diagonal bracing means and engaging said guideway means for riding back and forth therein when said conveyer is raised or lowered diagonally relative to the horizontal.

2. The combination recited in claim 1, wherein the diagonal bracing means comprises a structural frame extending transversely of the conveyer in a plane parallel to the plane of the latter.

3. The combination recited in claim 2, wherein the elongate guideway means comprises a pair of guideways depending from respectively opposite sides of the conveyer and provided with downwardly facing, longitudinal tracks; and wherein the said guide means comprises a pair of guides bearing against and adapted to ride along said tracks.

4. The combination recited in claim 3, wherein an engine for driving the conveyer is underslung from the conveyer above and immediately in advance of the axle at that side thereof disposed opposite the stem members of the L-shaped structural frames.

5. The combination recited in claim 4, wherein the rigid attachment of the short bar members of the L-shaped structural frames to the axle is provided by a pair of rigid hollow posts rising from rigid attachment to said axle, said short bar members being telescopically received by the respective posts, and is provided, further, by means for securing said short bar members to said posts at adjusted telescopic positions thereof.

6. The combination recited in claim 5, wherein each of the L-shaped structural frames has both its bar member and its stem member made up of closely fitting, concentric pipes.

7. The combination recited in claim 1, wherein the rigid attachment of the short bar members of the L-shaped structural frames to the axle is provided by a pair of rigid hollow posts rising from rigid attachment to said axle, said short bar members being telescopically received by the respective posts, and is provided, further, by means for securing said short bar members to said posts at adjusted telescopic positions thereof.

8. The combination recited in claim 1, wherein an engine for driving the conveyer is underslung from the conveyer above and immediately in advance of the axle at that side thereof disposed opposite the stem members of the L-shaped structural frames.

9. The combination recited in claim 1, wherein a tractor-hitch tongue extends, from attachment to the axle, outwardly thereof and longitudinally of the conveyer toward the said other end of the latter.

10. The combination recited in claim 9, wherein the tongue is telescopic.

11. The combination recited in claim 1, wherein winch means is provided for the said raising and lowering of the conveyer, the drum of said winch means being mounted adjacent said one end of the conveyer.

No references cited.